April 16, 1968  S. M. COHEN ET AL  3,377,972
LABEL SEWER
Filed March 22, 1965  12 Sheets-Sheet 11
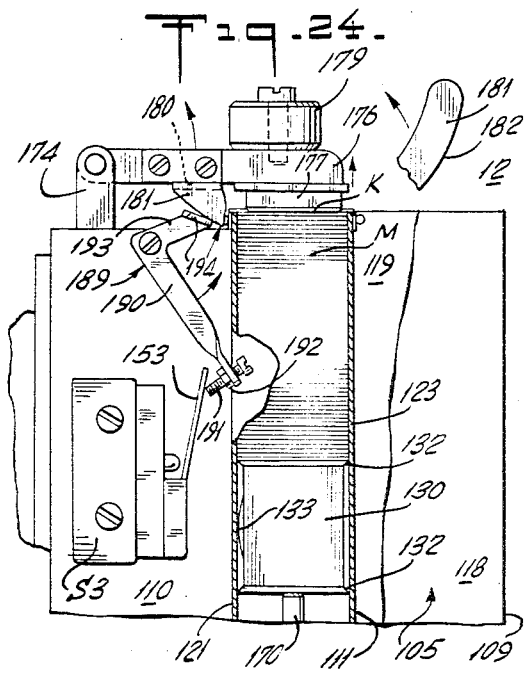
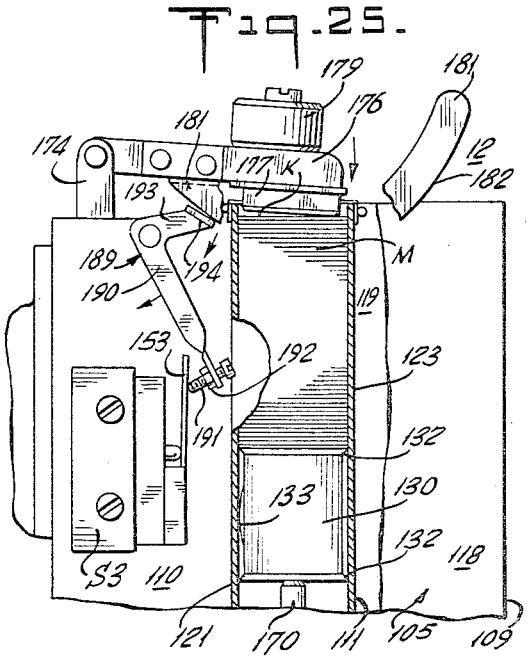
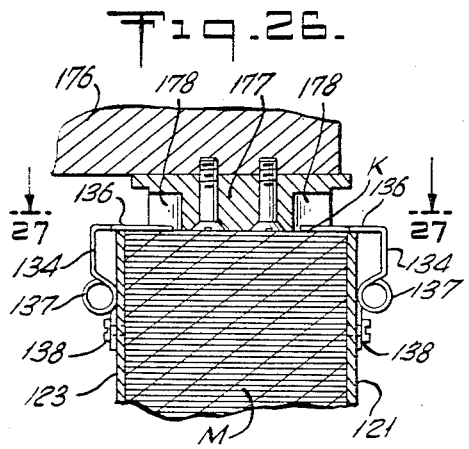
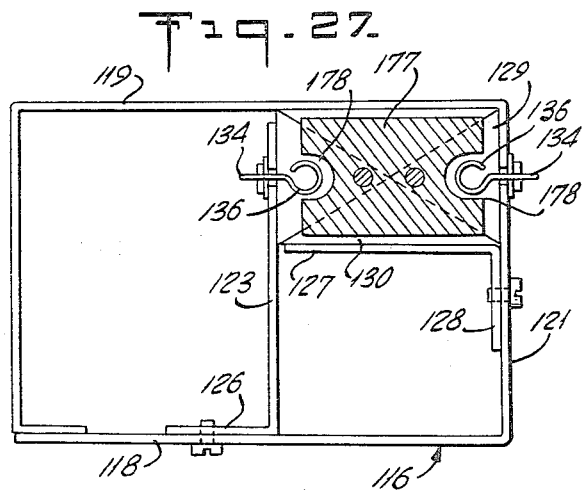
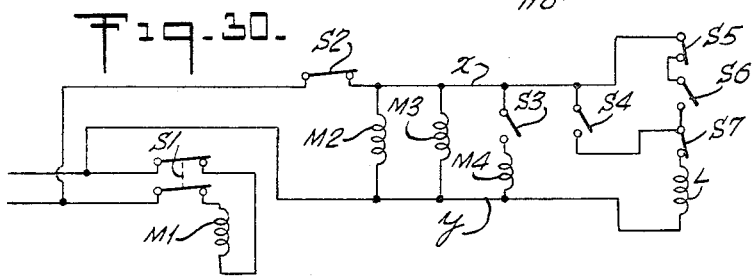

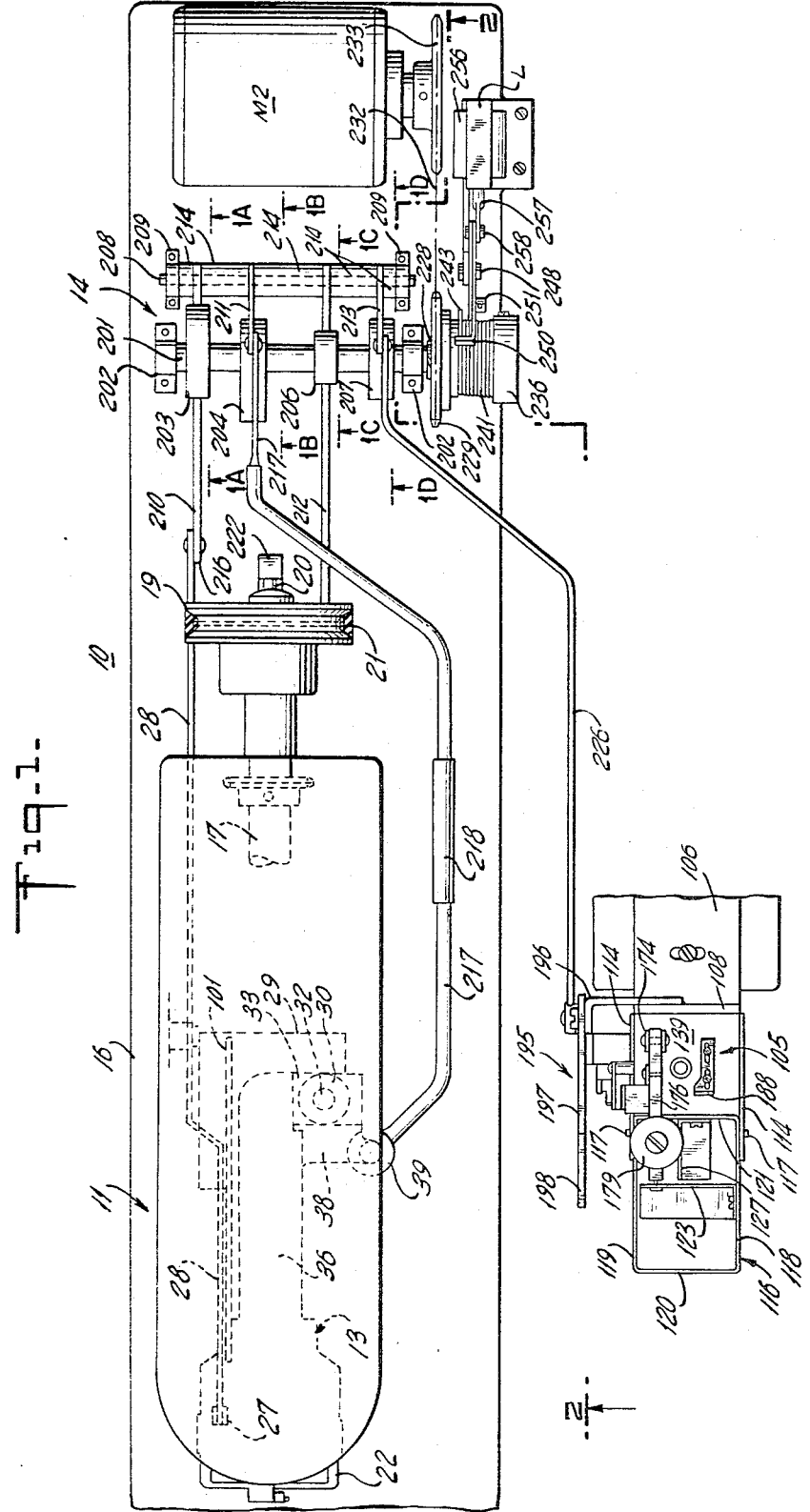

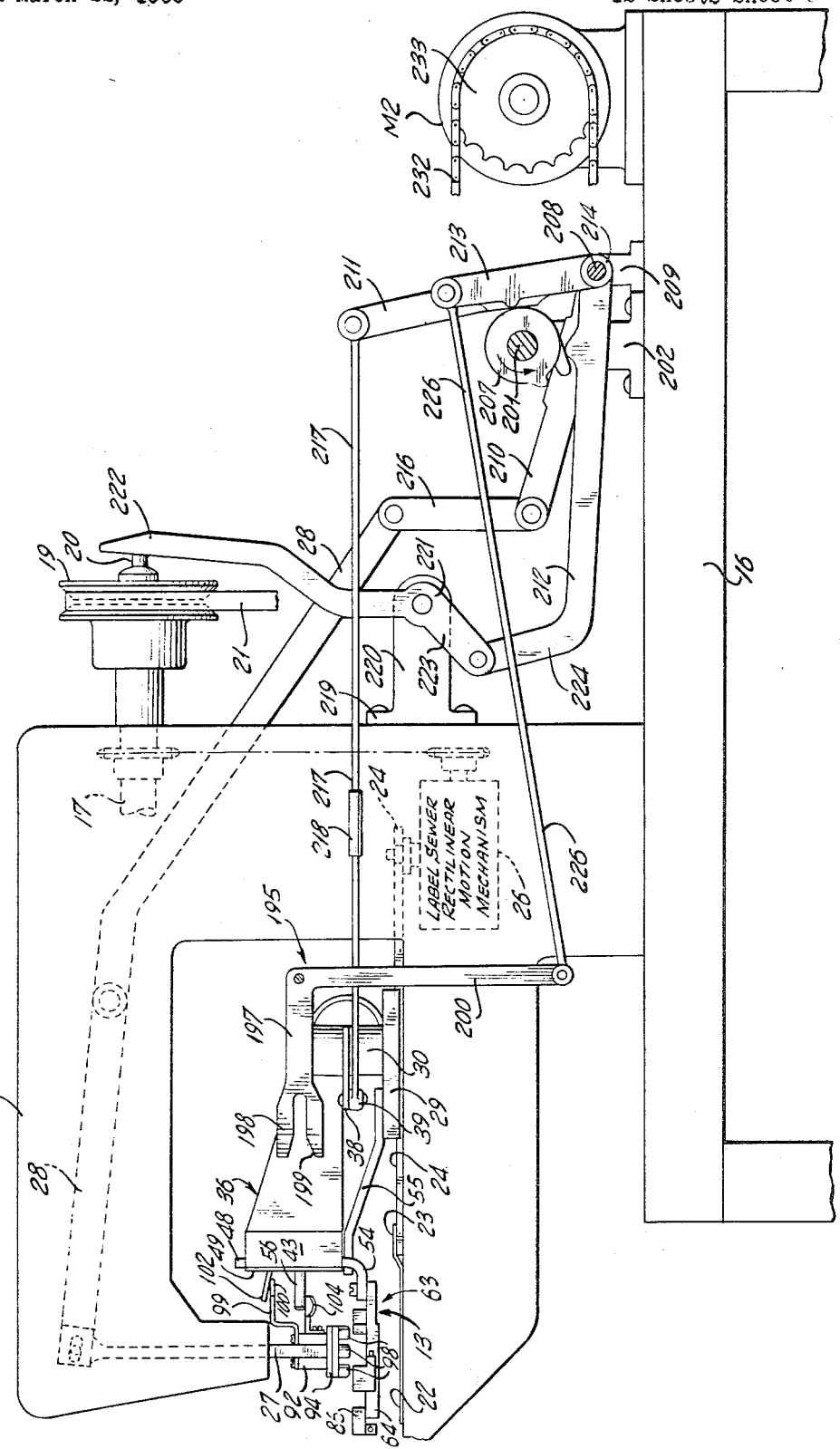

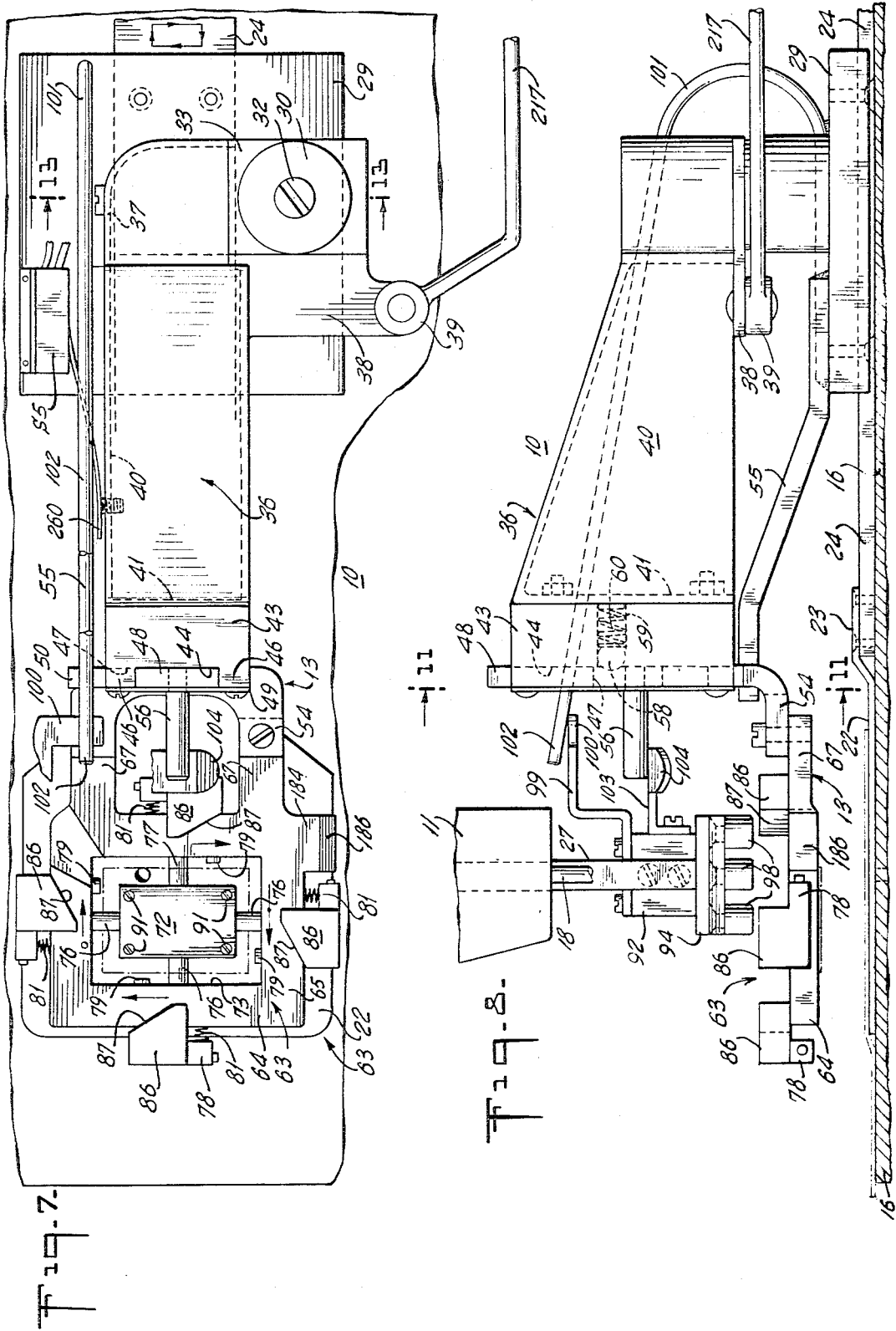

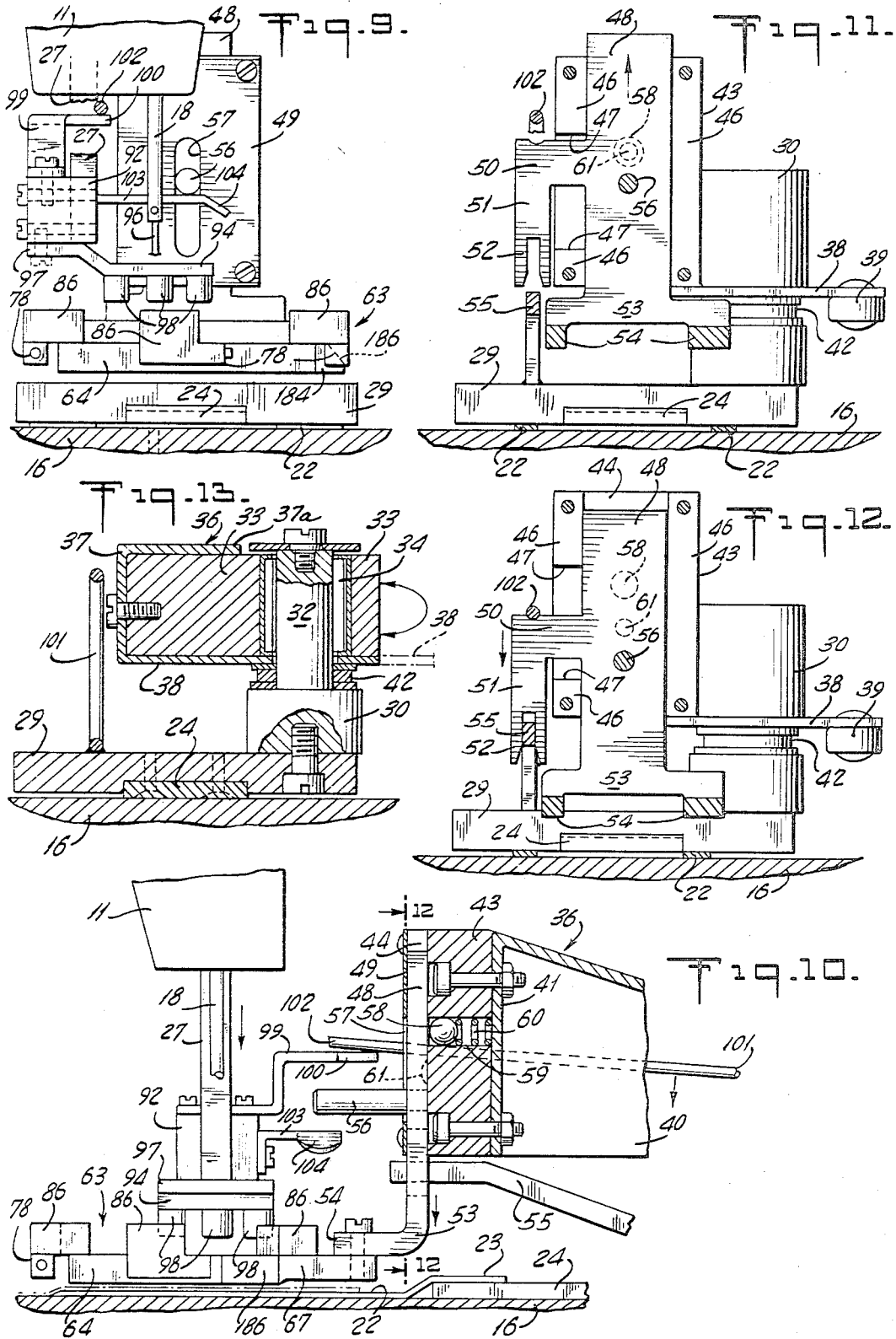

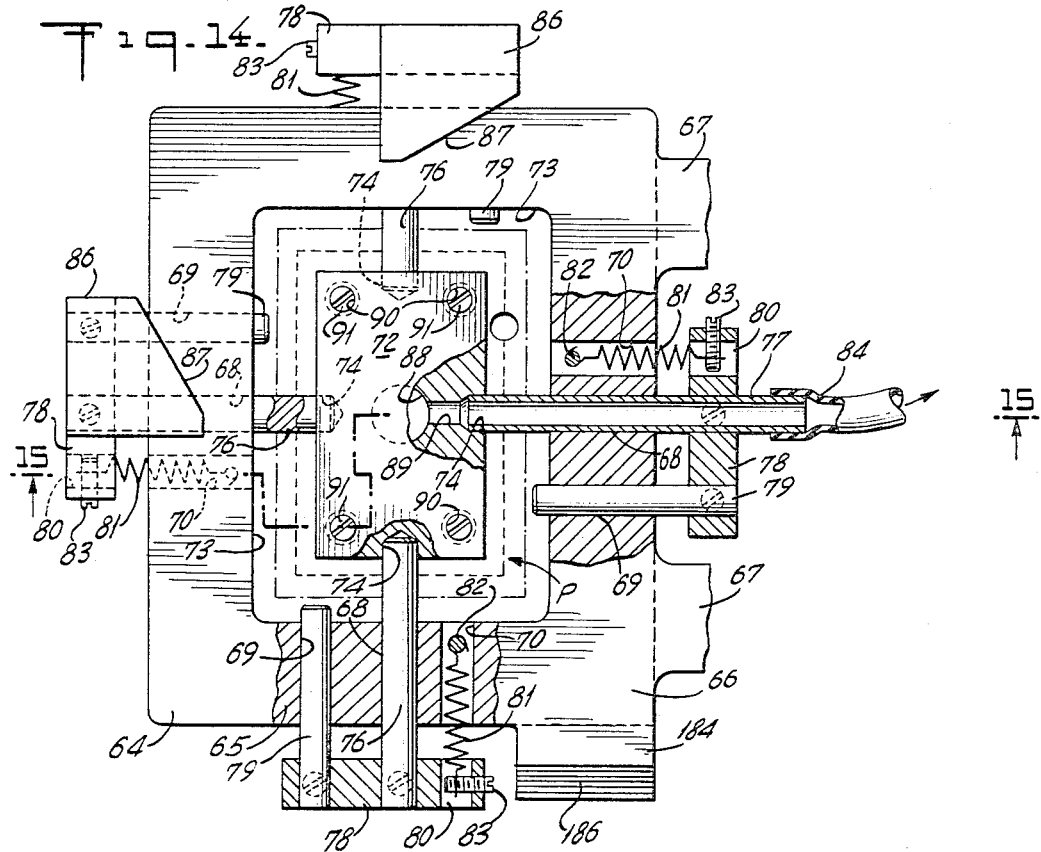
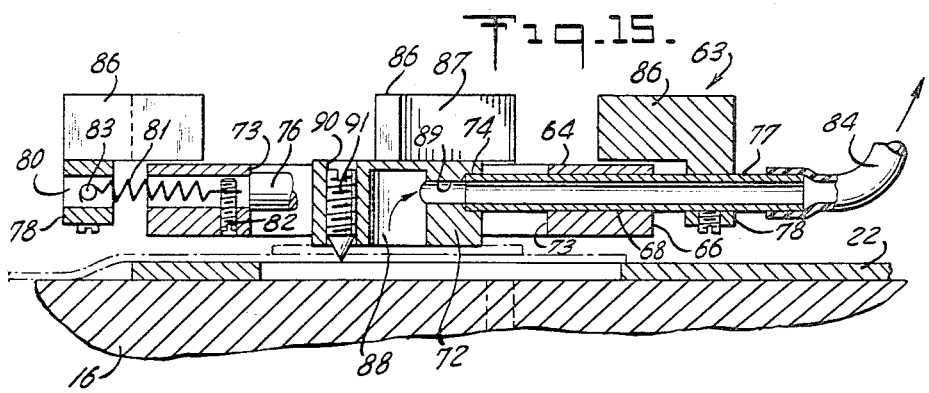

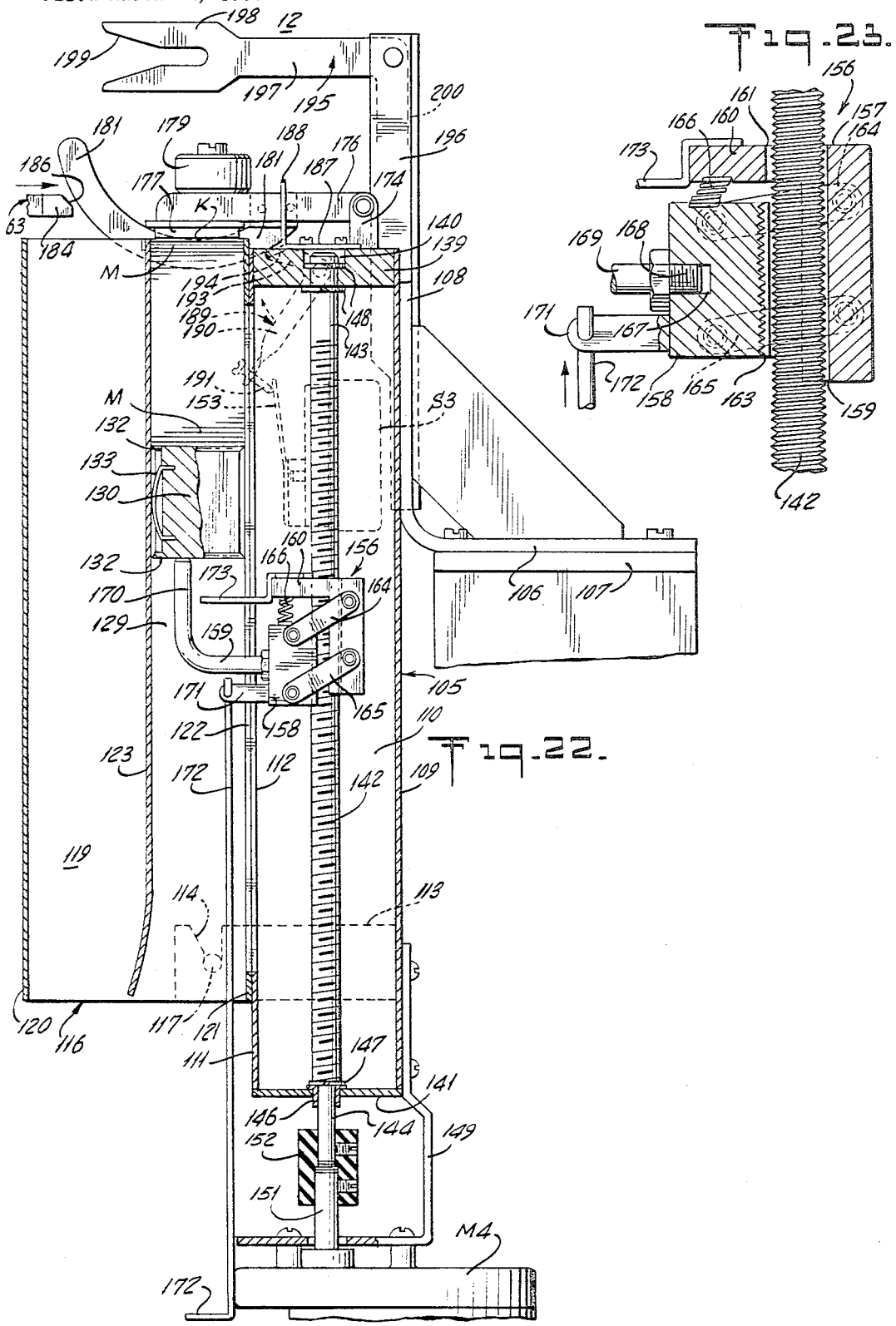

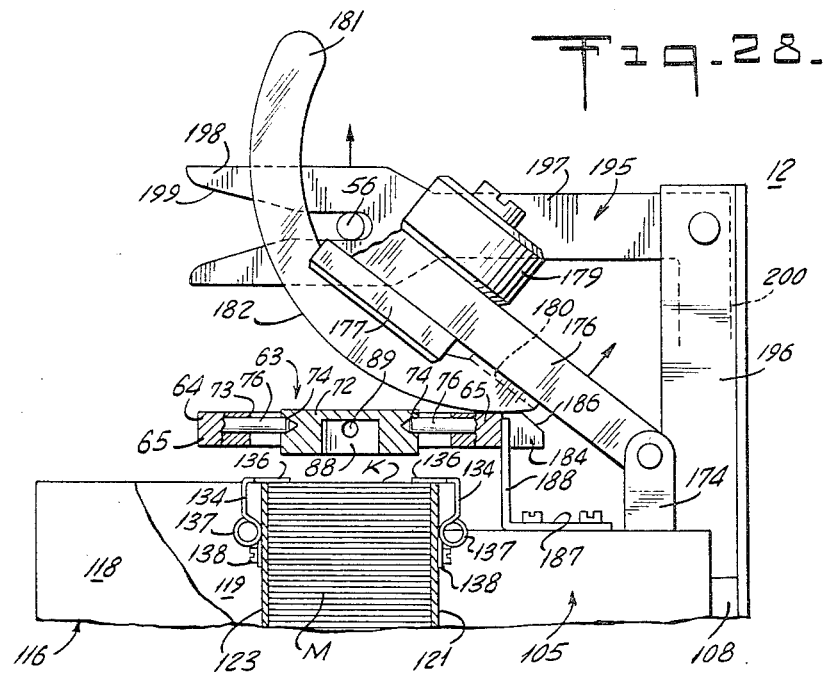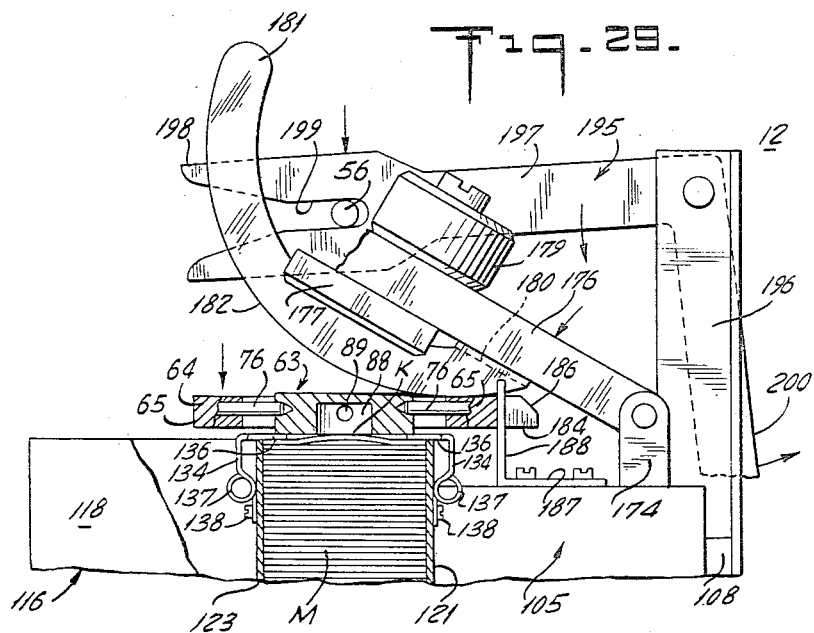

3,377,972
LABEL SEWER
Saul M. Cohen, 4 Marquette Court, Paramus, N.J., and Ernest Heuman, 39 Minami-Kyuhojimachi, 4-chome-Higashi-ku, Osaka, Japan
Filed Mar. 22, 1965, Ser. No. 441,426
20 Claims. (Cl. 112—104)

ABSTRACT OF THE DISCLOSURE

A label sewing machine includes a frame member having an opening with which a pad registers to define a rectangular passage. The pad is supported by the frame by retractable bars extending across the passage. The frame and pad are traversed with the reciprocation of the needle to traverse the needle along the passage, cam means being provided for successively retracting the bars with the approach to the needle and releasing the bars following the passage of the needle. A swinging arm transfers a label during each label sewing cycle from a stack to a position underlying the pad.

---

The present invention relates generally to improvements in sewing equipment and it relates in particular to an improved label applying and sewing apparatus.

The application and sewing of labels or the like to articles of wearing apparel or other articles or parts thereof are generally time consuming and hence expensive procedures. Conventional camtacking sewing machines are commonly employed in securing labels to work pieces, these machines being provided with a work support member and a traverse mechanism which advances the work support member along a path corresponding to that of the label. In using the conventional label sewing machine, the operator must place the work piece on the support member, superimpose and accurately support a label thereon and thereafter effect the sewing operation, a sequence which is time consuming and requires a high degree of skill and close attention. Thus, the conventional manner of sewing a label to a garment is awkward, expensive, unreliable in that the individual operator's skill varies, and otherwise leaves much to be desired.

It is, therefore, a principal object of the present invention to provide an improved sewing machine apparatus.

Another object of the present invention is to provide an improved apparatus for automatically applying and sewing labels to garments and other articles or parts thereof.

Still another object of the present invention is to provide an improved label applying and sewing apparatus in which the operator merely positions the work piece in the label applying station and thereupon simply closes a switch which effects the automatic accurate application and sewing of the label to the area of the work piece registering with the label applying station.

A further object of the present invention is to provide an improved label dispensing apparatus.

Still a further object of the present invention is to provide an improved indexing and sequence control mechanism.

Another object of the present invention is to provide an improved apparatus of the above nature characterized by its efficiency, ruggedness, reliability, flexibility, adaptability and ease of operation.

Figure 1A:
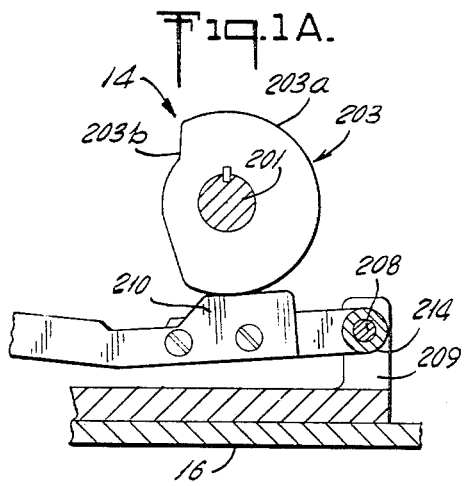
Figure 1C:
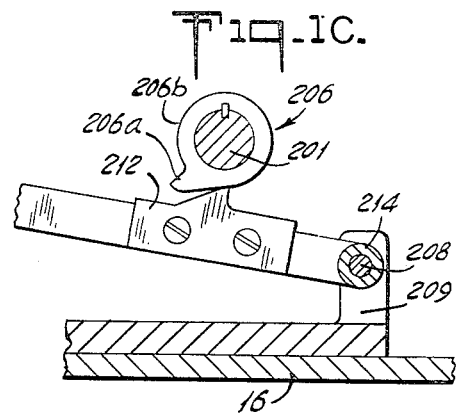
Figure 1B:
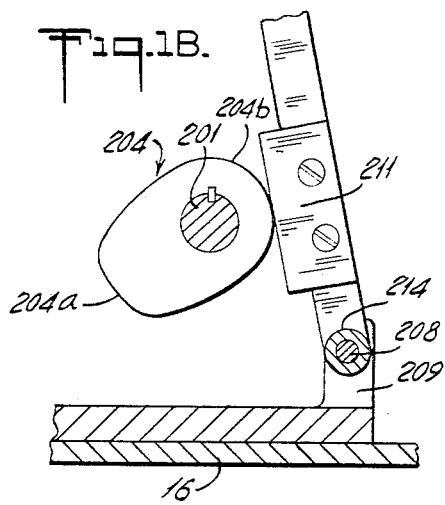
Figure 1D:
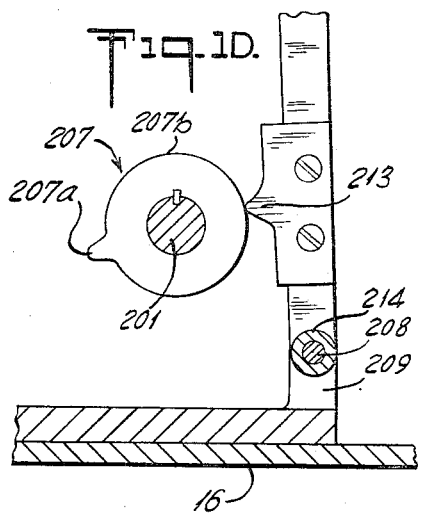
Figure 3:
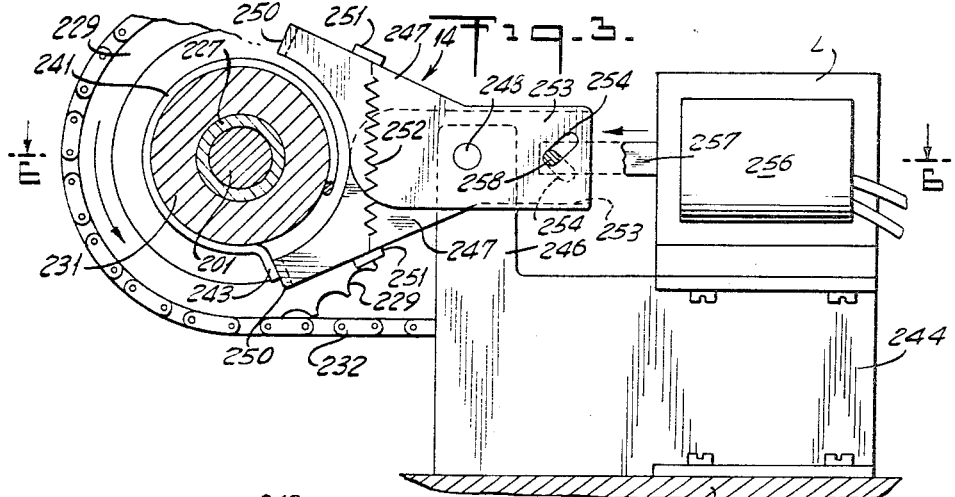
Figure 4:
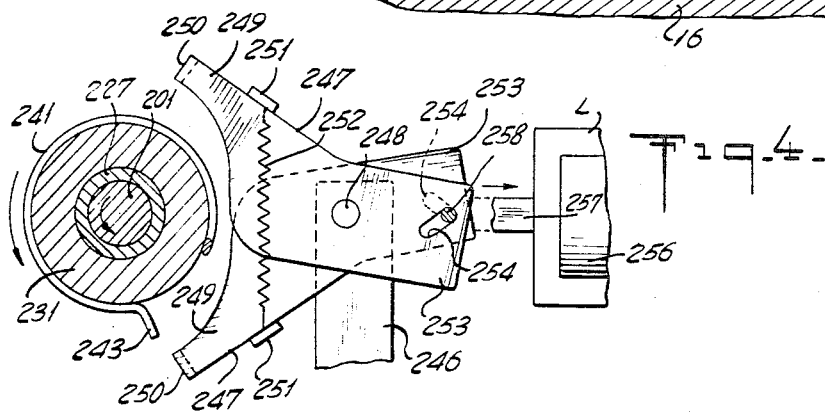
Figure 5:
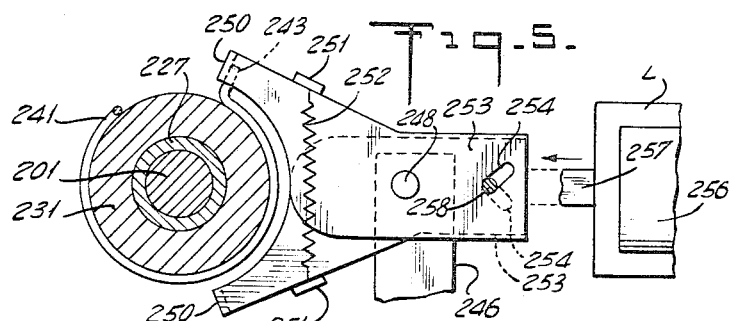
Figure 6:
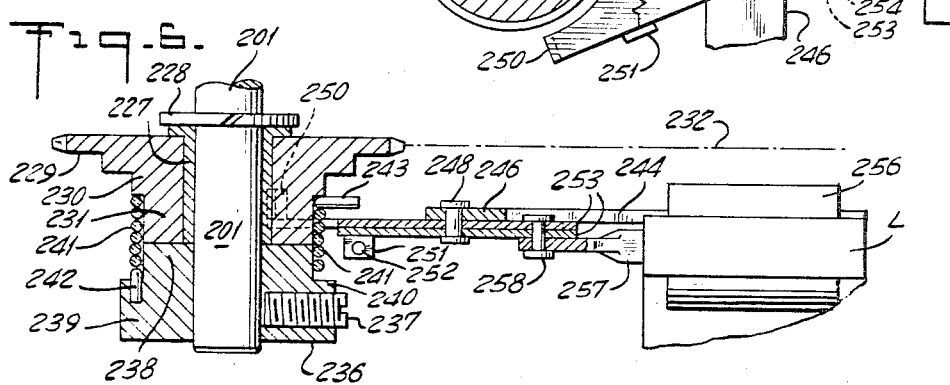
Figure 16:
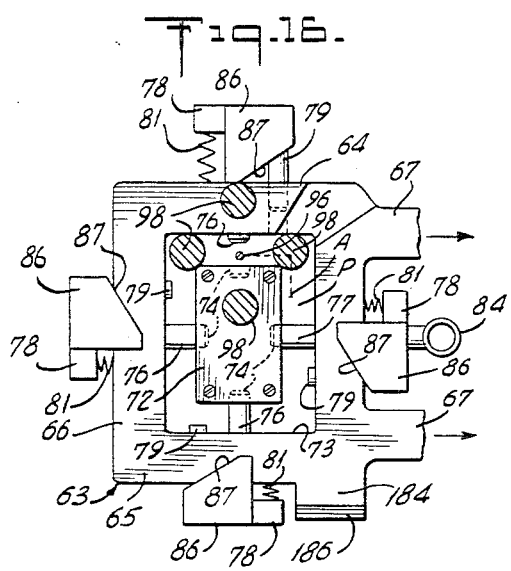
Figure 18:
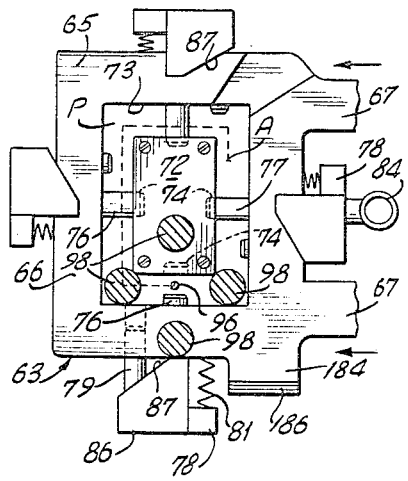
Figure 17:
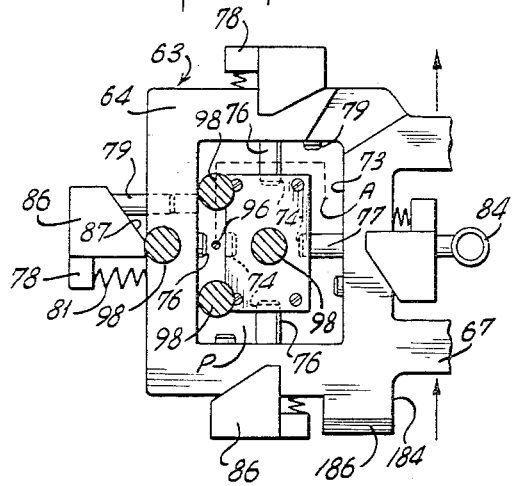
Figure 19:
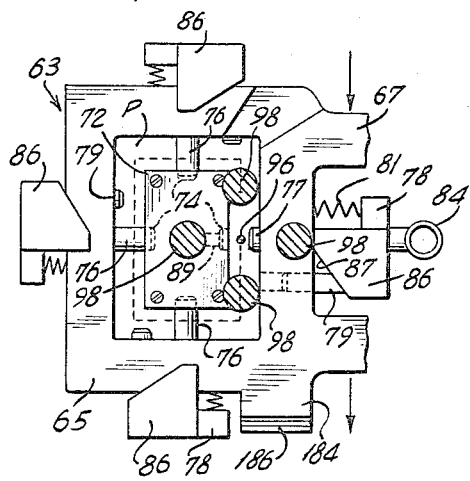
Figures 20, 21:
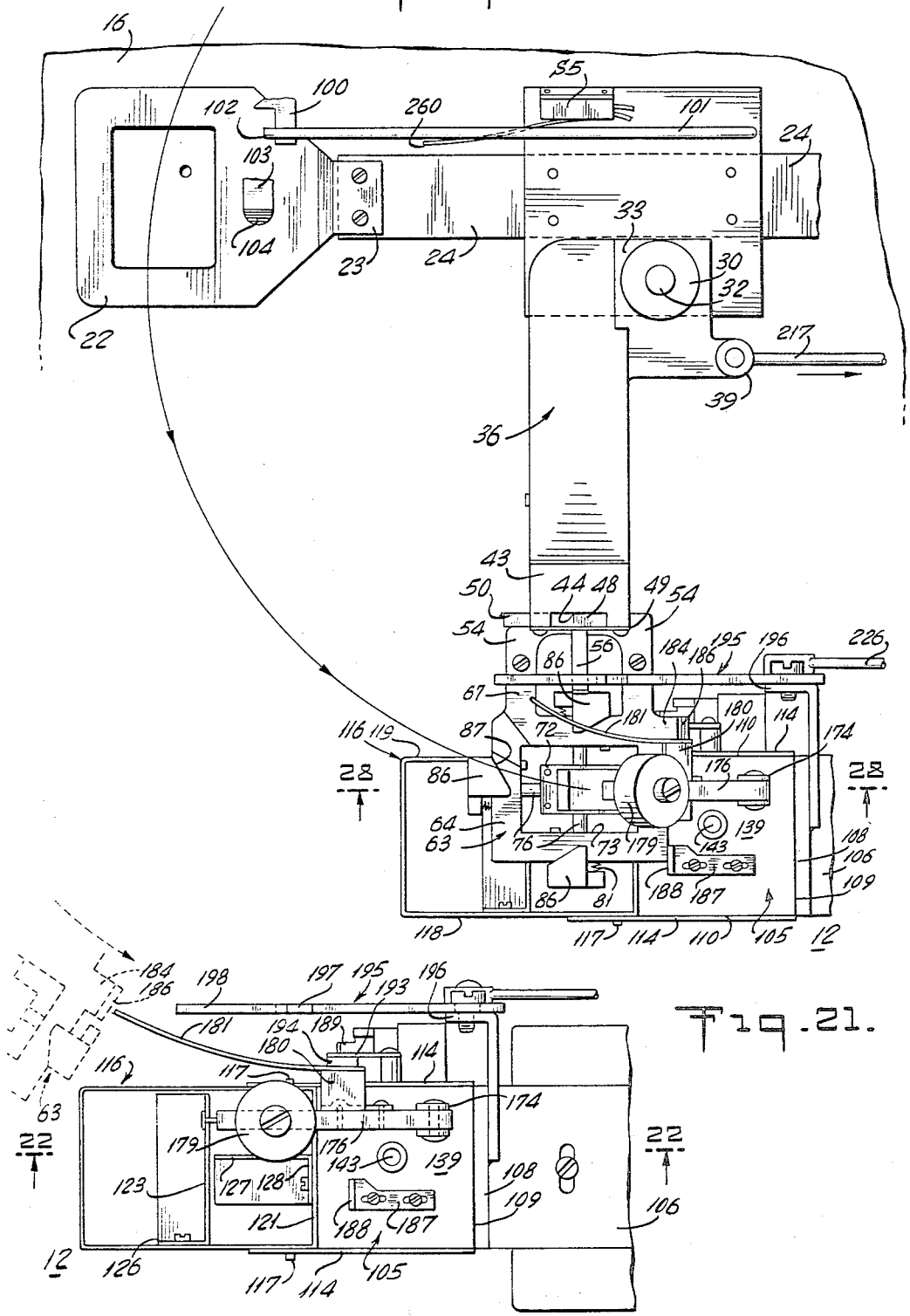

The above and further objects of the present invention will become apparent from a reading of the following description taken in conjunction with the accompanying drawings, wherein:

FIGURE 1 is a fragmentary top plan view of a label applying and sewing apparatus embodying the present invention;

FIGURE 1A is a sectional view taken along line 1A—1A in FIGURE 1;
FIGURE 1B is a sectional view taken along line 1B—1B in FIGURE 1;
FIGURE 1C is a sectional view taken along line 1C—1C in FIGURE 1;
FIGURE 1D is a sectional view taken along line 1D—1D in FIGURE 1;
FIGURE 2 is a sectional view taken along line 2—2 in FIGURE 1;
FIGURE 3 is a transverse sectional view of the indexing and operation sequencing mechanism employed in the present apparatus and illustrated in a first indexed rest position;
FIGURE 4 is a fragmentary view similar to FIGURE 3 of the indexing mechanism illustrated in an advancing position;
FIGURE 5 is a view similar to FIGURE 4 illustrating the indexing mechanism in a second indexed rest position;
FIGURE 6 is a sectional view taken along line 6—6 in FIGURE 3;
FIGURE 7 is a fragmentary top plan view of the label pickup and transfer mechanism illustrated in its retracted raised position;
FIGURE 8 is a fragmentary front elevational view thereof;
FIGURE 9 is an end elevational view thereof;
FIGURE 10 is a view similar to FIGURE 8 illustrating the label support or transfer head in a depressed label sewing position;
FIGURE 11 is a sectional view taken along line 11—11 in FIGURE 8;
FIGURE 12 is a sectional view taken along line 12—12 in FIGURE 10;
FIGURE 13 is a sectional view taken along line 13—13 in FIGURE 7;
FIGURE 14 is a fragmentary top plan view, partially in section, of the label transfer head;
FIGURE 15 is a sectional view taken along line 15—15 in FIGURE 14;
FIGURES 16 to 19 are top plan views of the label transfer head and a transverse sectional view of the connecting element retracting member illustrated in successive positions of the label sewing operation;
FIGURE 20 is a fragmentary top plan view of the label transfer mechanism and label dispenser, the label transfer head being illustrated in its advanced position in registry with the label dispenser;
FIGURE 21 is a fragmentary view similar to FIGURE 20, the label transfer head being retracted from the label dispenser;
FIGURE 22 is an enlarged sectional view taken along line 22—22 in FIGURE 21;
FIGURE 23 is an enlarged detailed longitudinal sectional view of the screw follower in the label dispenser;
FIGURE 24 is a fragmentary rear view of the upper part of the label dispenser with the label stack illustrated at dispensing level;
FIGURE 25 is a view similar to FIGURE 24 with the label stack illustrated at just below the dispensing level;
FIGURE 26 is a fragmentary vertical sectional view of the upper section of the label magazine and the stack level sensing pad;
FIGURE 27 is a sectional view taken along line 27—27 in FIGURE 26;
FIGURE 28 is an enlarged sectional view taken along line 28—28 in FIGURE 20, the label transfer head being illustrated in an advanced raised position;
FIGURE 29 is a view similar to FIGURE 28, the label transfer head being illustrated in an advanced depressed position; and FIGURE 30 is a schematic view of the apparatus control network.

In a sense, the present invention contemplates the provision of a label applying apparatus comprising a support bracket, a pad member having an edge spaced from said support bracket to delineate a passageway therewith, a plurality of connecting elements extending in their advance positions across said passageway between said pad member and support bracket and individually movable to retracted positions out of said passageway, a fastening member registering with said passageway, means for relatively moving said fastening member and said support bracket whereby said fastening member traverses said passageway, and means for successively retracting said connecting elements ahead of said fastening member during its traverse of said passageway and returning them to their advanced positions behind said fastening member. Still another feature of the present invention resides in a dispensing apparatus comprising a substantially vertical magazine having a top dispensing opening, a platform vertically movable in said magazine, a downwardly urged sensing member overlying said dispensing opening and movable in engagement therewith and means responsive to the level of said sensing member for raising said platform. Another feature of the subject apparatus is a drive mechanism comprising a pair of rotatable coaxial end-to-end arranged shafts, a helical coupling spring peripherally engaging the adjacent sections of said shaft and provided adjacent an end thereof with an outwardly directed lug, a plurality of peripherally spaced indexing elements located along the path of said lug and selectively movable into and out of said path.

According to a preferred form of the present apparatus there is included a sewing machine provided with a work support member and a traverse mechanism for advancing the work support member along a closed path corresponding to the border of the label being applied. The support bracket is part of a label transfer head and comprises a frame member mounted at one end of a swing arm pivoted at its opposite end to the work support member and horizontally swingable between a retracted position between the work support member and the sewing machine needle and an advanced position in pick up registry with a label dispenser. The support frame is vertically movable on the swinging arm and is provided along its periphery with bores which are axially aligned with corresponding bores formed in the pad member which is disposed within and has its edge spaced from the support frame. A connecting pin slidably registers with each of the support frame bores and is spring urged across the passageway to advanced positions in engagement with respective pad bores, and is provided with a cam element. A horizontally stationary pin retracting member is operatively associated with the pin retracting cams and engages successive of the cams successively to retract the connecting pins out of the passageway and thereafter release them in advance of and following the sewing needle with the traversing of the support frame. The pad member is provided with a port at its underface which communicates with one of the pad bores, the connecting pin registering with this bore being tubular and connected to a source of low pressure. The label dispenser includes a vertical magazine having a top dispensing opening and a platform vertically slidable along the height thereof. A motor driven vertical screw is provided with a selectively releasable follower which engages the platform and a vertically movable weighted screw pad registers with the label dispensing opening and controls a switch which in turn controls the energization of the screw drive motor. A cam is associated with the sensing pad and is engaged by the advancing support frame releasably to raise the sensing pad. A sequencing system comprises a series of cams mounted on a common drive shaft and provided with cam followers which effect successively the advancing of the raised transfer head into registry with the label dispenser, the lowering and raising of the head to pick up a label, the retraction of the label carrying head, the lowering of the head and the connecting pin control member, the motivation of the sewing machine and traversing mechanism for a single cycle and the raising of the transfer head and pin control member. The cam shaft is indexed and rotated a single revolution by the above drive mechanism.

Referring now to the drawings which illustrate a preferred embodiment of the present invention and particularly FIGURES 1, 2, 7 and 8 thereof, reference numeral 10 generally designates the improved label applying and sewing apparatus which comprises a label sewing machine head 11 of the lock stitch tacker type, for example, a "Singer" model 269 or 68 lock stitch tacker, a label dispenser 12, a label pickup and transfer mechanism 13 and a sequencing mechanism 14. The sewing machine head 11 is mounted in the usual manner on a table 16 which suitably supports label dispenser 12 and sequencing mechanism 14, the label transfer mechanism 13 being carried by sewing machine head 11 as will be hereinafter set forth.

The sewing machine 11 includes a main drive shaft 17 which is operatively connected to a needle bar 18 for effecting the reciprocation thereof. A clutch pulley 19 is mounted on and coupled to shaft 17 and is controlled by a longitudinally movable, coaxial, outwardly projecting pin 20, depression of which pin 20 effects a driving engagement between pulley 19 and shaft 17. The release of pin 20 effects disengagement of pulley 19 from shaft 17. Pulley 19 is connected by a belt 21 to the machine main drive motor which is provided with a clutch and brake. An automatic mechanism of any known type is provided automatically to position the sewing needle in a raised position and for trimming the sewing thread following the sewing cycle.

Associated with sewing machine head 11 and forming part thereof is a rectangular work support frame 22 which is disposed below needle bar 18, and slidably rests on the sewing machine platform, and is provided with a raised trailing tongue 23 secured to the leading upper face of a longitudinally extending traverse bar 24. The trailing end of traverse bar 24 is affixed to the output of a traverse mechanism 26 of conventional construction commonly associated with camtacking machines, for example, the Singer Model No. 269 machine, the input shaft of which is coupled to main drive shaft 17 by means of sprocket wheels which are affixed to the respective shafts and connected by a sprocket chain. The traverse mechanism 26 advances traverse bar 24 and frame 22 along an adjustable path, which may be rectangular and correspond in shape to an applied label, with the rotation of shaft 17, the traverse path being controlled by replaceable cams. A presser foot bar 27 is vertically movably supported by the sewing machine head in the usual manner, and a longitudinally extending angulated lever 28 is pivoted between its ends to the sewing machine head for rocking about a transverse pin, and is provided at its leading end with a yoke which engages the upper end of presser foot bar 27 to permit the vertical movement thereof.

As best seen in FIGURES 7 to 13 of the drawings, a horizontal mounting plate 29 is secured to the upper face of traverse bar 24 intermediate its ends and extends forwardly and rearwardly of bar 24. A cylindrical block 30 is fastened to the upper forward section of plate 29 and is provided with an integrally formed, upwardly directed coaxial pivot post 32. A radially projecting block 33 is journalled to pivot post 32 for swinging in a horizontal plane by means of a roller bearing 34 registering with a vertical bore formed in the block 33 and engaging pivot post 32.

A bracket or sewing arm 36 is provided at its trailing end with a cup-shaped clamp section suitably secured to block 33, and including a vertical web 37 abutting vertical faces of block 33, a short upper arm 37a overlying the top face of block 33 and a long bottom arm 38 underlying the bottom face of said block. Arm 38 has an aperture formed therein registering with pivot post 32 and projects beyond the pivot post 32 and is provided at its leading front corner with an integrally formed coplanar lug 39. A vertical web 40, reinforced by an upper peripheral flange, is secured to the leading face of the clamp wall 37 and defines a bell crank with leg 38. Mounted on the leading end of vertical web 40 is vertical transverse mounting plate 41. A thrust bearing 42 is sandwiched between the confronting faces of leg 38 and block 30, and swing arm 36 is locked in assembled condition with pivot post 32 by means of a washer and screw fastened to the upper end of pivot post 32 and overlying block 33.

A mounting block 43 is secured to the front face of plate 41 by means of nuts and bolts, and has medially formed in its front face a rectangular vertical channel 44 bordered by side walls 46, the rear side wall 46 having a vertically extending recess 47 formed therein. A vertical bar 48 axially slidably engages channel 44 and is retained therein by a face plate 49 screwed to channel walls 46 and overlying the front face of slide bar 48. An integrally formed horizontal arm 50 is directed rearwardly from slide bar 48 through recess 47 and terminates in a depending leg 51 having a bifurcated bottom end or yoke 52.

Formed at the bottom of slide bar 48 is a transverse cross piece 53 terminating in forwardly directed horizontal legs 54. A forwardly directed follower rod 56 is secured to slide bar 48 and projects through a vertical slot 57 in face plate 49. In order to releasably retain slide bar 48 in its raised position, a detent ball 58 slidably registers with a longitudinally extending bore 59 formed in block 43 and is urged toward the rear face of slide bar 48 by a helical compression spring 60 entrapped between detent ball 58 and mounting plate 41. A shallow concavity 61 is formed in the rear face of slide bar 48 and engages detent 58 when slide bar 48 is in its raised position.

A label transfer head 63, as best seen in FIGURES 7, 8, 10, 14 and 15, is mounted on the lower end of slide bar 48, and includes a flat horizontal closed rectangular frame member 64 formed of front and rear longitudinal legs 65 and leading and trailing transverse legs 66. A pair of transversely spaced arms 67 are directed longitudinally rearwardly from trailing frame leg 66. These are secured by screws to the bottom legs 54 of slide bar 48. Medially formed across and through each frame leg 65 and 66 are a main circular first bore 68, a circular second bore 69 parallel to and horizontally offset relative to the corresponding first bore 68, and a third spring housing bore 70, parallel to first bore 68 and disposed on the opposite side thereof relative to second bore 69.

A rectangular foot piece or pad member 72 registers with the rectangular aperture 73 in frame member 64 and has a horizontal flat underface below the level of the underface of frame member 64. The peripheral edges of pad member 72 are substantially equally spaced from the corresponding frame edges bordering aperture 73 and delineate therewith a rectangular passageway P of somewhat larger dimensions than the border of the label being applied. A horizontal cylindrical well 74 is formed in each of the peripheral faces of pad member 72 in coaxial alignment and of substantially the same diameter as the corresponding first bore 68 in frame 64, and is provided with a conical base.

A cylindrical, solid connecting pin 76 slideably registers with each of the frame first bores 68 formed in frame legs 65 and the leading frame leg 66, and a tubular connecting pin 77 slideably registers with the first bore 68 formed in trailing frame leg 66. Connecting pins 76 and 77 are normally in engagement with respective pad wells 74, the pins 76 having tapered inner ends mating the conical bases of wells 74.

A cross-bar 78 is secured to the trailing section of each of connecting pins 76 and 77, and is parallel to and spaced outwardly from the corresponding frame legs 65 and 66 when the connecting pins 76 and 77 are in engagement with pad wells 74. Each cross-bar 78 has a transverse bore formed therein which engages the trailing end of each of the connecting pins 76 and 77, said pin 77 projecting beyond the respective cross-bar 78, and the connecting pins are secured to the cross-bars by suitably engaged set screws. A cylindrical guide rod 79 slideably engages each of the frame second bores 69, and is secured at its outer end in an aligned aperture formed in a corresponding cross bar 78. An aperture 80 is formed in each of cross-bars 78 in alignment with a respective bore 70. A helical tension spring 81 extends through each bore 70 and has one end thereof secured at the inner end of the bore by means of a diametric screw 82 and the other end thereof secured by means of a screw 83 in aperture 80. Thus, each cross-bar 78 is urged under the influence of a corresponding tension spring 81 toward its inner advanced position with the respective connecting pins 76 and 77 in releasable engagement with aligned pad wells 74. The outer end of tubular pin 77 is connected to a low pressure or suction device of any suitable type, for example a suction pump, by means of a flexible tube 84.

Mounted atop each cross-bar 78 is a horizontal, similarly shaped cam block 86 which projects across and is disposed slightly above the top face of each of frame legs 65 and 66. Each cam block 86 is provided with an inner vertical cam face 87 which extends diagonally across the outer section of each of the frame leg top faces, the inner ends of the cam faces 87 extending across and beyond the axial projections of the corresponding connecting pins 76, 77, and the outer ends of the cam faces 87 being disposed outside the peripheral edge of the frame 64 and peripherally leading connecting pins 76 and 77.

The under face of pad member 72 is below the level of the under face of frame 64, and has a centrally located cylindrical well 88 formed therein which communicates by means of an upper transverse bore 89 with the pad well 74 engaged by tubular connecting pin 77. A tapped vertical bore 90 is formed in each corner of the pad member 72 and is engaged by a label retaining screw 91 having a pointed tip projecting below the underface of pad member 72.

Secured to the bottom rear face of presser foot bar 27, as seen in FIGURES 8 to 10 of the drawing, is a mounting block 92. A diamond shaped bracket frame 94 is disposed below and forward of block 92, and is centrally disposed relative to the needle bar 18, having an aperture formed therein in vertical axial alignment with the sewing needle 96 carried by needle bar 18 in the usual manner. Frame 94 is provided with a rearwardly directed leg 97 screwed to the under face of block 92, and joined to the rear corner of bracket frame 94 by a forwardly downwardly inclined arm. Depending from each corner of bracket frame 94 is a freely rotatable cam actuator defining roller 98, which rollers are symmetrically arranged relative to the vertical axial path of sewing needle 96. As seen in FIGURES 16 to 19, followers 98, cams 86, needle 96 and the path imparted to transfer head frame 64 by traverse mechanism 26 are so related that frame 64 traverses a path to advance passageway P delineated by frame 64 and pad member 72 along the stroke of needle 96 so that needle 96 relatively traverses passageway P. With the advance of frame 94, cam faces 87 of successive cams 86 in advance of needle 96 are engaged by respective cam actuating elements 98 to effect the retraction of the corresponding cam 86, cross-bar 78, and a connecting pin 76, 77 out of engagement with a mating pad well 74, and from passageway P out of the advancing path of needle 96 just forward of needle 96, and disengages cam 86 following the passage of needle 96 to release cam 86 and permit the return of the connecting pin into engagement with the pad well following the passing of the needle.

Mounted atop block 92 by means of an L-shaped bracket and extending longitudinally therefrom is a trailing arm 99 terminating in a forwardly directed lug 100. A hair pin spring 101 is fastened to the rear top face of mounting plate 29 and is provided with a longitudinally extending upwardly inclined arm 102, the free end of which bears on the upper face of lug 100 resiliently to urge bar 19, block 92 and the components carried thereby downwardly. The transverse arm 50 of slide bar 48 lies in the path of spring arm 102, being disposed below spring arm 102 when slide bar 48 and spring arm 102 are in their raised positions, and being engaged by spring arm 102 and lowered thereby when spring arm 102 is in its depressed position. A cam member or arm 103 is mounted on and extends from the trailing face of block 92 and is provided with a forwardly downwardly inclined upper cam face 104 which is disposed in the path of pin 56 when block 92 is in its raised position and arm 36 is swung rearwardly whereby to assure the fully raised positioning of slide bar 48 and transfer head 63 when the latter is retracted.

Label dispenser 12, as best seen in FIGURES 20 to 29, is located forwardly of the label transfer mechanism in transverse alignment with pivot post 32, and is mounted on table 16. An angle bracket includes a horizontal arm 106 secured to a base plate 107 and provided with a vertical arm 108. Fastened to bracket arm 108 and depending therefrom is a housing 105 comprising a channel shaped member including a vertical transverse end wall 109 and front and rear walls 110. An end wall 111 extends between the leading vertical edges of front and rear walls 110 and has a vertical slot 112 formed therein. A pair of longitudinally forwardly projecting, transversely spaced support arms 113 are secured to the lower sections of front and rear walls 110 and have recesses 114 formed in the upper edges thereof leading the end wall 111.

A label magazine 116 is supported by arms 113 and is provided with a pair of transversely projecting pins 117 which engage recesses 114 and is suitably releasably locked in position by conventional latch means (not shown), connecting the upper end of magazine 116 to front and rear walls 110. Magazine 116 is in the form of a vertical open-ended conduit of rectangular transverse cross-section, including front and rear vertical walls 118 and 119 respectively and transversely extending leading and trailing end walls 120 and 121, end wall 121 abutting housing end wall 111 and having a vertical slot 122 coinciding with vertical slot 112. A vertical transverse partition 123 is provided with a vertical flange 126 screw connected to front wall 118, and a vertical longitudinal partition 127 is provided with a vertical flange 128 screw connected to end wall 121, partitions 123 and 127 delineating an open ended label stack chute 129 of rectangular cross-section which may be adjusted by varying the positions and dimensions of partitions 123 and 127. The lower section of partition 123 is downwardly outwardly curved to facilitate the loading of the magazine chute with a stack of labels.

A stack-supporting and advancing platform defining block 130 slideably registers with chute 129 and is provided with peripheral lips 132 along its top and bottom faces engaging corresponding partitions and walls 123, 127 and 119 and 121. An outwardly bowed vertical leaf or wire spring 133 terminates in horizontal legs which engage corresponding wells in the leading face of block 130, and is entrapped and under pressure between partition 123 and the confronting wall of block 130. In order to retain the topmost label K of the stack M thereof at the level of the top or dispensing opening of chute 129 there is provided a pair of pressure fingers 134 in registry with the dispensing opening. Pressure fingers 134 are mounted on partition 123 and wall 121 and are transversely medially disposed relative to chute 129. Each finger 134 is defined by a longitudinally extending wire arm terminating in a circular section 136 and integrally formed with a wire hairpin spring 137 terminating in a downwardly directed leg 138 secured to the outer face of the corresponding partition 123 and end wall 121. Thus, each finger section 136 bears downwardly to maintain releasably the topmost label K at the level of the dispensing opening while permitting its upward separation by the pull of pad member 72 and the suction at its underface.

The upper end of housing 105 is provided with a relatively heavy top wall 139 having a top countersunk vertical bore 140 centrally formed therein, and the lower end of housing 105 is provided with a bottom wall 141 having a central aperture in axial alignment with vertical bore 140. Extending vertically along the length of and within housing 105 is a feed screw 142 terminating at its upper end in an unthreaded section 143 journalled in bore 140 and at its lower end in a stub shaft 144 of reduced cross-section. A bushing 146 registers with the aperture in bottom wall 141 and stub shaft 144 projects therethrough and is provided with a peripheral groove engaged by a split ring 147 directly above bushing 146. A pair of split rings 148 engage corresponding grooves in screw section 143 and abut opposite shoulders of bore 140 to prevent axial movement of feed screw 142.

A motor bracket 149 includes an upwardly directed vertical leg secured to the housing trailing wall 109 and a horizontal bottom leg disposed below housing wall 141. An electric drive motor M4 depends from and is mounted on the bracket horizontal leg and is provided with a drive shaft 151 directed upwardly to and coaxial with screw shaft 144. A coupling sleeve 152 engages and interconnects shafts 144 and 151 and is affixed thereto by set screws engaging tapped radial bores in sleeve 152. The motor M4 is connected through a normally open switch S3 to a source of energizing current. Switch S3 is mounted on the upper outer face of rear housing wall 110 and is provided with an upwardly inclined actuating arm 153 the depression of which closes switch S3 in the manner hereinafter described and energizes motor M4.

A follower assembly 156 engages feed screw 142 and includes a pair of longitudinally extending complementary sections or blocks 157 and 158 which releasably embrace feed screw 142. The follower section 157 has a longitudinally extending smooth arcuate groove 159 formed in its inner face slideably engaging feed screw 142, and is provided at its upper end with a diametrically projecting arm 160 having a smooth vertical bore 161 formed therein and registering with feed screw 142. Follower section 158 is disposed opposite section 157 directly below arm 160 and has formed in its inner face a threaded vertical arcuate groove 163 which mates and releasably engages feed screw 142.

The front and rear faces of follower sections 157 and 158 lie in transversely spaced longitudinal vertical parallel planes respectively, and the follower sections are interconnected by similar front and rear pairs of upper and lower parallel links 164 and 165, respectively, which are pivotally connected at their ends to the front and rear faces of follower sections 157 and 158 at equally vertically spaced points. Thus, each pair of links 164 and 165, with follower sections 157 and 158, define parallelogram linkages which restrict the follower sections 157 and 158 to mutually parallel positions. A helical compression spring 166 is entrapped between the confronting horizontal faces of follower section 158 and arm 160, the ends of spring 166 engaging shallow wells in these faces resiliently to urge the follower sections 157 and 158 longitudinally apart and hence into releasable embracing engagement with feed screw 142 by reason of the parallelogram linkage.

A tapped longitudinal bore 167 is formed in the leading face of follower section 158 and is engaged by the threaded end 168 of a horizontal arm 169 which projects through slots 112 and 122 and terminates in an upwardly directed leg 170 which engages the underface of platform block 130. A nut engages threaded section 168 and is tightened to follower section 158 to lock leg 169 to the follower section. Secured to the lower part of follower section 158 and projecting through slots 112 and 122 is an arm 171 which supports from its free end a depending push rod 172 which extends below magazine 116 and terminates in a suitable finger piece. A finger piece 173 is mounted on arm 160 and projects through slots 112 and 122. By longitudinally urging follower sections 157 and 158 toward each other against the influence of spring 166 by means of finger piece 173 and arm 169 or arm 171 follower assembly 156 may be disengaged from feed screw 142 to permit the adjustment of the follower assembly along the length of feed screw 142 either up or down. Further, the follower assembly 156 may be raised along feed screw 142 by pushing upwardly on rod 172 which effects the disengagement of the feed screw 142 by the follower assembly 156 and the raising of the follower assembly.

A post 174 is mounted atop housing wall 139 and has a swing arm 176 pivoted thereto and projecting into overlying relationship to the top dispensing opening of label chute 129. Screw-connected to the underface of swing arm 176 is a pad or block 177 of rectangular transverse cross-section of smaller dimensions than chute 129. A pair of vertical recesses 178 is formed in the end faces of pad 177 in registry with and of larger cross section than the finger ring sections 136 to permit the clearance thereof. It should be noted that when the underface of pad 177 is at the level of the label dispensing opening, it is substantially horizontal and can enter chute 129 when the level of label stack M is below that of the dispensing opening. In order to assure adequate downward pressure by pad 177 on label stack M a weight member 179 is mounted to the top free end of swing arm 176.

Secured to swing arm 176 intermediate its ends is a rearwardly projecting horizontal arm 180 supporting at its free end a cam member 181. Cam member 181 is in the form of a curved arm lying along a cylindrical surface coaxial with pivot post 32 and having a bottom cam edge 182 which curves in a leading direction upwardly from arm 180. A cam-actuating element or detent 184 projects forwardly from the front trailing corner of transfer frame 64, and is provided with an upper front beveled cam-defining edge 186. Actuating element 184 is so located that with the advance of swing arm 36 it engages and traverses cam edge 182 to swing cam edge 182 and arm 176 upwardly. The advance of swing arm 36 and transfer head 63 is limited by a stop member 187 adjustably mounted on housing top wall 139 and provided with an upright leg 188 lying in the path of transfer frame front leg 65.

A bell crank 189 is pivotally connected at its knee to the housing rear wall 110 for swinging about a transverse axis, and includes a depending leg 190 provided at its lower end with a tapped longitudinal bore engaged by a screw 191. Screw 191 bears on the switch-actuating arm 153 and is axially adjustable and set by an engaging lock nut 192. The bell crank second arm 193 terminates in an inclined transverse lug 194, the upper face of which lies in the path of cam edge 182 of cam arm 181. It should be noted that when cam arm 181 is in its released depressed position and the top of the label stack M is a predetermined distance below the label dispensing opening, the cam arm swings bell crank 189 clockwise sufficiently, as seen in FIGURE 25, to actuate and close switch S3 and under other conditions switch S1 is open. The level at which label stack M effects the closing of switch S3 is adjusted by means of screw 191.

In order to effect the lowering and raising of transfer head 63 when in registry with the label dispensing opening and thus effect the pick up of a label, a bell crank 195 is provided and pivoted at its elbow to the upper part of a vertical post 196 which is directed upwardly from bracket arm 108. Bell crank 195 includes an upper longitudinally extending arm 197 which terminates in an outwardly directed yoke member 198 having an opening 199 which separates the yoke legs and which diverges outwardly. When transfer head 63 is in its raised position pin 56 carried by slide bar 48 is at the level of yoke opening 199 when arm 197 is in its raised condition so that, with the advance of swing arm 36 and transfer head 63, pin 56 is carried into engagement with yoke 198. Bell crank 195 includes a depending arm 200.

The mechanism for motivating and sequencing the label transfer and label sewing operations, as best seen in FIGURES 1 to 6, includes a transversely extending cam shaft 201 trailing sewing head 11 and journalled in a pair of transversely spaced pillow blocks 202 mounted atop table 16, shaft 201 projecting forwardly of front pillow block 202. Keyed to shaft 201 are four axially spaced motivating cams 203, 204, 206 and 207 respectively, the first cam 203 controlling the vertical position of bar 27 and the vertical position of transfer head 63 when the latter is in its retracted position, the second cam 204 effecting the oscillation of swing arm 36 with the transfer head 63, the third cam 206 controlling pulley clutch 19, and the fourth cam 207 effecting the lowering and raising of the transfer head when the latter is in its advanced position in registry with the label dispenser.

A transversely extending axle 208 is supported by a pair of axially spaced brackets 209 below and rearwardly of and parallel to cam shaft 201. Swingably supported by axle 208 are a first rocker arm 210 which extends below and is provided with a follower engaging the underface of first cam 203, a second rocker arm 211 directed upwardly from axle 208 and provided with a follower engaging the trailing face of second cam 204, a third rocker arm 212 extending below third cam 206 and provided with a follower engaging the underface of cam 206, and a fourth rocker arm 213 directed upwardly from axle 208 and provided with a follower engaging the trailing face of fourth cam 207. Rocker arms 210, 211, 212 and 213 are spring urged to maintain the followers carried thereby in engagement with the respective cams 203, 204, 206 and 207, and are positioned along axle 208 by spacer sleeves 214 engaging axle 208 and disposed between brackets 209 and the rocker arms.

First rocker arm 210 is connected at its free end by a vertical link 216 to the trailing end of angulated lever 28. First cam 203 includes a raised section 203a which extends for somewhat more than 180° and the remainder is a depressed section 203b. When cam sections 203a and 203b are engaged by the corresponding cam follower, bar 27 and cam actuating elements 98 are raised and lowered respectively through the first rocker arm 210, link 216 and lever 28. The upper end of second rocker arm 211 is coupled by an angulated connector rod assembly 217 provided with a spring loaded coupling section 218 to the corner lug 39 of swing arm 38, the ends of rod assembly 217 being pivotally connected to lug 39 and rocker arm 211. Second cam 204 includes a raised section 204a and a depressed section 204b which, when engaged by the corresponding cam follower, swings transfer head 63 to its advanced and retracted positions respectively by means of rocker arm 211, connector rod assembly 217, swing plate 38 and swing arm 36.

A bracket 219 is secured to the trailing face of the sewing machine head 11 and includes a projecting leg 220 which swingably supports an angulated lever 221 provided with an upwardly extending arm 222 which bears at its upper end on clutch control pin 20, and a downwardly projecting arm 223. The third rocker arm 212 terminates at its leading end in an upwardly directed leg 224 which is pivotally connected to the free end of arm 223. The third cam 206 is provided with a raised section 206a of short peripheral extent and a remaining depressed section 206b, which respectively effect the engagement and disengagement of clutch pulley 19 by way of the corresponding cam follower, rocker arm 212, lever 221 and control button 20. The upper end of the fourth rocker arm 213 is coupled by connecting rod 226 to the lower end of bell crank arm 200, and the fourth cam 207 is provided with a raised section 207a of short peripheral extent and a depressed section 207b which respectively lower and raise yoke 198 and transfer head 63 when the latter is in its advanced position, through the corresponding cam follower, rocker arm 213, connecting rod 226 and bell crank 195.

A bearing sleeve 227 is positioned on shaft 201 forward of the front block 202 and is provided with a rear peripheral flange which is spaced from the block 202 by a washer 228. A sprocket wheel 229 is freely rotatably mounted on bearing sleeve 227 and includes a hub section 230 and an integrally formed tubular axial stub shaft 231 of smaller diameter than hub section 230 and delineated therefrom by a peripheral shoulder. Sprocket wheel 229 is coupled by a sprocket chain 232 which is keyed to the drive shaft of a low speed motor M2 suitably mounted on table 16.

A wheel 236 is affixed to the free forward end of cam shaft 201 in abutting end-to-end relationship with stub shaft 231 and is affixed to cam shaft 201 by a set screw 237 engaging a tapped radial bore in wheel 236 and bearing on shaft 201. Wheel 236 includes an inner section 233 adjacent to and of the same diameter as stub shaft 231 to define therewith a substantially continuous cylindrical surface. The inner section 238 is delineated from the outer larger diameter section 239 of wheel 236 by a peripheral shoulder 240. A helical coupling or clutch wire spring 241, preferably of square transverse cross-section, is wound around and snugly engages stub shaft 231 and wheel section 238 and extends substantially between the limiting shoulders thereof. The outer end of coupling spring 241 terminates in an outwardly directed longitudinal leg 242 which engages and is anchored in a mating longitudinal well formed in wheel section 239. The inner end of coupling spring 241 terminates in a radially outwardly directed leg 243 which abuts the inner shoulder of shaft 231 and projects beyond it.

As viewed in FIGURES 3 to 5 of the drawings, sprocket wheel 229 and stub shaft 231 are driven counter-clockwise by motor M2 and the coupling spring 241 has a left hand pitch. Thus, in the absence of any impediment in the circular path of clutch control spring leg 243, the counter-clockwise rotating stub shaft 231 effects the winding of clutch spring 241 by reason of the frictional engagement thereof by stub shaft 231 to compress spring 241 tightly and radially and hence effect a tight rotatable coupling between shaft 231 and wheel 236 which, in turn, rotates cam shaft 201. However, any impediment placed in the path of control leg 243 to limit the advance thereof will effect a slight unwinding and radial expansion of spring 241 and hence the decoupling between shaft 231 and wheel 236 and the prevention of further rotation of wheel 236 and cam shaft 201.

The clutch control and indexing mechanism includes a longitudinally extending vertical bracket plate 244 suitably mounted on table 16 and provided at its leading end with an upright leg 246 trailing and shortly forwardly of spring clutch control leg 243. A symmetrically shaped pair of indexing levers 247 are mounted in vertical abutting positions on the upper part of bracket leg 246 by means of a pivot pin 248 for rocking about a transverse axis at the level of the axis of cam shaft 201. Each lever 247 includes a leading first arm 249 terminating in a rearwardly directed leg or indexing detent 250 which is swingable into and out of the circular path of clutch spring leg 243 with the corresponding rocking of the indexing levers 247. A pair of forwardly directed transverse legs 251 are formed on lever arms 249 trailing the ends thereof and are interconnected by a helical tension spring 252 which resiliently urges lever arms 249 toward each other and detents 250 into the path of spring leg 243 at points spaced a predetermined peripheral distance along the path of spring leg 243.

Indexing levers 247 are provided with trailing arms 253 which have formed therein angularly related overlapping slots 254 which are oppositely inclined. An actuating solenoid L is suitably mounted on the upper trailing edge of bracket plate 244 and is provided with a retractable axially slidable plunger or armature 257. A transverse pin 258 is mounted at the free end of armature 257 and slidably engages slots 254 whereby, upon energization of solenoid 256, armature 257 is retracted to effect the separation of lever arms 249 by cooperation of rearwardly moving pin 256 and slots 254 thereby to retract the detents from the path of spring leg 243 and, upon deenergization of solenoid 256, armature 257 is released and lever arms 249 returned to their retracted positions, with the detents returned to the path of spring leg 243. Thus, the momentary energization of solenoid 256 retracts detents 250 to release spring leg 243 and effect the clutch spring drive engagement between shaft 231 and wheel 239 to rotate spring leg 243 past the path position of the corresponding detent 250 to the path of spring leg 243 which then travels into engagement with the other detent 250 to effect the drive disengagement and stopping of wheel 236 and cam shaft 201 at a position spaced a predetermined angle from its initial position. Cam shaft 201 rotates a single revolution with each two momentary energizations of solenoid 256 and is brought to rest at predetermined angularly related positions as delineated by the circumferential spacing between detents 250.

As seen in FIGURE 30 of the drawing, the electrical network associated with the present apparatus includes the main drive motor M1 which is coupled to the drive belt 21 in the usual manner, the cam drive motor M2, a motor M3 driving a vacuum pump which is connected to tubular pin 77 by way of hose 84, and the label dispenser feed screw drive motor M4. The main drive motor M1 is connected through a toggle switch S1 to the electric power supply and a pair of feed lines $x$ and $y$ are connected to opposite terminals of the electric power supply through a toggle switch S2. Motors M2 and M3 are connected directly across the lines $x$ and $y$ and motor M4 is connected across lines $x$ and $y$ through the normally open switch S3.

Actuating solenoid L is connected between lines $x$ and $y$ through the series-connected, normally closed switch S7, normally open switch S6 and normally open switch S5, the series-connected switches S5 and S6 being shunted by a normally open switch S4. Switch S4 is coupled in any suitable manner to the presser foot bar 27 to be urged to its closed position with the depression of the bar. Switch S5 serves as a safety switch and, as seen in FIGURE 7 of the drawings, includes an actuating arm 260 which is disposed in the path of swing arm 36 to close switch S5 only when swing arm 36 and transfer head 63 are in their fully retracted positions. Switch S6 is a selectively operable cycle-initiating switch, and switch S7 is associated with the traverse mechanism 26 in any suitable manner so as to be open only at the beginning and end of the traverse cycle which points coincide since the traverse path is closed.

Considering now the operation of the label applying apparatus described above, switches S1 and S2 are closed to energize motors M1, M2 and M3 and the lines $x$ and $y$. In the rest position of the apparatus, awaiting the initiation of the label applying and sewing cycle, transfer head 63 is in its retracted raised position, and a label L is carried by the underface of pad member 72 with its borders projecting beyond the edge of the pad member. The label is maintained thereon by the suction at port 88, bar 87 and the cam engaging elements are in their raised positions and the clutch pulley 19 is disengaged. Switches S4 and S6 are open and switches S5 and S7 are closed, as shown in FIGURE 30. Clutch spring leg 243 is engaged by lower stop detent 250, as seen in FIGURE 3, and cams 203, 204, 206 and 207 and rocker arms 210, 211, 212, and 213 are in the positions shown in FIGURES 2A to 2D.

The operator positions the work piece to which the label is to be sewn between transfer head 63 and traverse frame 22 and momentarily closes cycle initiating switch S6. Solenoid L is thus energized to retract armature 257 and separate lever arms 249 and thereby release clutch spring leg 243 and effect the rotation of the cam shaft 201 and the motivating cam. With the rotation of cam shaft 201 and the first cam depressed section 203b is advanced into engagement with the corresponding follower to effect raising of rocker arm 210 and swinging of lever 28 counterclockwise to release the presser bar which is urged by spring arm 102 with actuating elements 98 to its depressed position. Spring arm 102 is released with the lowering of bar 27 to engage and bear down on arm 51 to depress slide bar 48 and effect the lowering of transfer head 63 under the influence of the spring. The lowered slide bar 48 brings yoke 52 into engagement with latch arm 55 to releasably lock transfer head 63 in its retracted position. The lowered bar 27 closes switch S4 to by-pass switches S5 and S6.

The third cam raised section 206a then engages the corresponding follower to depress rocker arm 212 and swing lever 222 and shift clutch pulley 19 to engage position whereby to drive traverse mechanism 26 and needle bar 18. The start of the traverse mechanism and needle bar effects the opening of switch S7 to deenergize solenoid L and effect the contraction of lever arms 249, the disengagement of the spring clutch, and the stopping of cam shaft 201 with clutch spring leg 243 in engagement with upper indexing detent 250.

As seen in FIGURES 16 to 19, transfer head 63 is advanced by traverse mechanism 26 during the sewing sequence in a closed rectangular path P delineated by the confronting edges of frame 64 and the pad 72 starting and ending at a point A in alignment with the sewing needle 96 located at about the midpoint of the rear half of the path trailing transverse section. At this position of the transfer head cams 86 are disengaged by actuating elements 98, and connecting pins 76 and 77 are in their advanced positions in engagement with corresponding pad wells 74.

The transfer head is first advanced forwardly and then to the right and, as needle 96 approaches the rear connecting pin 76, rear actuating element 98 engages cam surface 87 of rear cam 86 to retract cam 86 and the respective connecting pin 76 from the path P ahead of needle 96. As the transfer head continues its movement to the right the needle passes rear connecting pin 76 and actuating element 98 releases rear cam 86 to effect the spring-influenced return of rear connecting pin 76 across path P into engagement with a corresponding pad well 74. Transfer head 63 continues its rectangular traverse, successive connecting pins 76 and 77 being retracted in advance of and released following the position of the needle 96 along the path P as aforesaid until the starting point A is reached, at which point the sewing machine drive is automatically stopped in the known manner with needle 96 in a raised position and the thread automatically cut.

With the termination of the sewing and traverse operation switch S7 is closed, thereby to complete the circuit to solenoid L through closed switch S4 to effect the energization of the solenoid L and the release of spring clutch leg 243 by reason of separating lever arms 249. Cam shaft 201 is thus rotated with the motivating cams. The third cam raised section 206a passes the corresponding follower to effect the raising of rocker arm 212 and the disengagement of clutch 19 and the first cam raised section 203a engages the corresponding follower to depress rocker arm 210 and raise bar 27 against the influence of spring 102 and actuating element support block 92. The rising block 92 lifts slide bar 48 by way of the block carried arm 103 and slide bar rod 56, slide bar 48 in turn lifting transfer head 63. With the raising of bar 27 switch S4 is opened to deenergize solenoid L and contract lever arms 249 to return detents 250 to the path of clutch spring leg 243, cam shaft 201 continuing to rotate until leg 243 reaches lower detent 250 in completion of a revolution.

With the rotation of cam shaft 201 second cam raised section 204a engages the corresponding follower to swing rocker arm 211 to the right and advance swing arm 36 through rod 217 and plate 38, whereby to advance transfer head 63 into registry with the label dispensing opening. As transfer head 63 approaches the label dispenser the frame-carried cam element 184 engages cam surface 182 of arm 181 to swing arm 181, arm 176 and pad 177 upwardly, out of the path of transfer head 63, the latter being stopped by abutment member 188 with pick up pad 72 in vertical registry with the label dispensing opening. While the pick up head is positioned above the label dispensing opening, fourth cam raised section 207a engages and passes the corresponding follower to swing fourth rocker arm 213 to the right and back, to rock yoke 198 down and up by way of rod 226 and bell crank 195. Rocking yoke 198 lowers and raises transfer head 63 by way of the engaged rod 56 and slide bar 48, the underface of pick up pad 72 engaging the topmost label K in stack M and retaining it thereon and pulling it past retaining fingers 134 by suction at port 88. Following the raising of transfer head 63 by yoke 198, second cam raised portion 204a passes the corresponding follower to return rocker arm 211, swing arm 36 and transfer head 63 to their retracted positions to close switch S5, which was open by the advance of the swing arm 36, and thereby ready the machine for the next cycle. The work piece may then be removed and replaced by the next piece, the apparatus being in its initial condition. It should be noted that the tapered pad screw 91 assures proper alignment and retention of the label during the application and sewing thereof.

When transfer head 63 moves from its advanced position in registry with the label dispenser cam arm 181 is released permitting arm 176 and pad 177 to return to their depressed positions. Pad 177 engages the topmost label K of the stack M and under normal conditions does not swing bell crank arm 190 sufficiently to actuate the switch S3. However, should the label stack M be depleted to a point where the top label K is below a predetermined level, pad 177 and arm 176 will return to a point to swing the bell crank 190 sufficiently to actuate switch S3 to a close position whereby to energize motor M4 and rotate feed screw 142. Rotating feed screw 142 elevates follower 156 and platform 130 to raise the label stack M. With the raising of stack M to the desired level, bell crank arm 190 is swung by way of raised pad 177 and arm 176 to release switch S3 to its open position, deenergize motor M4 and stop the feed screw and stack platform elevation. Upon complete depletion of the label stack M magazine 116 is removed from housing 105, as aforesaid, and chute 129 is replenished with a stack of labels, platform 130 having been lowered. Follower 156 is lowered by depressing finger piece 173 to release follower 156 from the feed screw, and the filled magazine is then replaced and follower 156 raised by raising push bar 172 until rod 170 engages the underface of platform 130. It should be noted that filled reserve magazines 116 may be provided so that a depleted magazine may be more rapidly replaced with less machine down time.

While there has been described and illustrated a preferred embodiment of the present invention, it is apparent that numerous alternations, omissions and additions may be made without departing from the spirit thereof.

What is claimed is:

1. A panel applying apparatus comprising a support bracket, a pad member having an edge spaced from said support bracket to delineate a passageway therewith, a plurality of connecting elements extending in their advanced positions across said passageway between said pad member and support bracket and individually movable toward retracted positions out of said passageway, a fastening member registering with said passageway, means for relatively moving said fastening member and said support bracket whereby said fastening member traverses said passageway, and means for successively retracting said connecting elements ahead of said fastening member during its traverse of said passageway and returning them to their advanced positions behind said fastening member.

2. In combination with a sewing machine including a needle reciprocatable along a predetermined path, a support bracket, a pad member having an edge spaced from said support bracket to delineate a passageway therewith registering with said needle path, a plurality of connecting elements extending in their advanced position across said passageway between said pad member and support bracket and individually movable toward retracted positions out of said passageway, means for advancing said support bracket and pad with said needle path traversing along the length of said passageway, and means for successively retracting said connecting elements ahead of said needle path during its traverse of said passageway and returning them to their advanced positions behind said needle path.

3. In combination with a sewing machine including a needle reciprocatable along a predetermined path, a support frame, a pad member located within said support frame and having a peripheral edge spaced from said support frame and delineating therewith a peripheral passageway registering with said needle path, a plurality of connecting elements extending in their advanced positions across said passageway between said pad member and support frame and individually movable toward retracted positions out of said passageway, means for advancing said support frame and pad with said needle path traversing along the length of said passageway, and means for successively retracting said connecting elements ahead of said needle path during its traverse of said passageway and returning them to their advanced positions behind said needle path.

4. In combination with a sewing machine including a needle reciprocatable along a predetermined path, a support frame, a pad member located within said support frame and having a peripheral edge spaced from said support frame and delineating therewith a peripheral passageway registering with said needle path, a plurality of connecting elements carried by and extending in their advanced positions from said support frame across said passageway into engagement with said pad member and individually movable toward said frame to retracted positions out of said passageway, means for advancing said support frame and pad member with said needle path traversing along the length of said passageway, and means for successively retracting said connecting elements ahead of said needle path during its traverse of said passageway, and returning them to their advanced positions behind said needle path.

5. In combination with a sewing machine including a needle reciprocatable along a predetermined path, a support frame, a pad member located within said support frame and having a peripheral edge spaced from said support frame and delineating therewith a peripheral passageway registering with said needle path, a plurality of connecting elements carried by and extending in their advanced positions from said support frame across said passageway into engagement with said pad member and individually movable toward said frame to retracted positions out of said passageway, cooperating cam and follower means intercoupling each of said connecting elements and points stationary relative to said needle path for successively retracting said connecting elements ahead of said needle path during its traverse of said passageway and returning them to their advanced positions behind said needle path.

6. In combination with a sewing machine including a needle reciprocatable along a predetermined path, a support frame, a pad member located within said support frame and having a peripheral edge spaced from said support frame and delineating therewith a peripheral passageway registering with said needle path, said pad member and support frame having formed therein along said passageway a plurality of pairs of axially aligned bores, a connecting pin slidably engaging each of said support frame bores and movable between an advanced position across said passageway into engagement with a corresponding pad member bore and a retracted position out of said passageway, spring means normally urging each of said connecting pins toward its advanced position, means for advancing said support frame and pad member along a path with said needle path traversing along the length of said passageway, and means for successively retracting said connecting pins ahead of said needle path during its traverse of said passageway and releasing them behind said needle path.

7. In combination with a sewing machine including a needle reciprocatable along a predetermined path, a panel magazine having an upwardly directed panel feed opening, a support frame, a pad member located within said support frame and having a peripheral edge spaced from said support frame and delineating therewith a peripheral passageway and provided with an underface having a panel pickup and retaining means, means supporting said frame for movement between a retracted position with said passageway in registry with said needle path and an advanced position with said pad member in registry with said magazine feed opening, a plurality of connecting elements extending in their advanced positions across said passageway between said pad member and support frame and individually movable to retracted positions out of said passageway, means for advancing said support frame and pad member with said needle path traversing along the length of said passageway, means for successively retracting said connecting elements ahead of said needle path during its traverse of said passageway and returning them to their advanced positions behind said needle path, and means for selectively reciprocating said frame between its retracted and advanced position.

8. In combination with a sewing machine including a needle vertically reciprocatable along a predetermined path, means for driving said needle, a work support member positioned below said needle and means for advancing said work support member along a predetermined horizontal path with the reciprocation of said needle, a frame mounted on and above said work support member and movable therewith, a pad member carried by said frame and having a peripheral edge delineating a passageway therewith which traverses said needle path with the movement of said work support member, a label magazine having a label dispensing opening, means for moving said frame between a retracted position in registry with said work support member and an advanced position in registry with said label dispensing opening, means for picking up and retaining a label at the underface of said pad member, a plurality of connecting pins mounted on said frame and individually movable between advanced positions across said passageway in engagement with said pad member and retracted positions out of said passageway, and pin retracting means including a relatively stationary member and elements mounted on respective of said pins and adapted to engage said stationary member to retract successive connecting pins leading said needle path and advance said connecting pins following said needle path with the traverse of said frame with said support member.

9. The combination of claim 8, wherein said frame and pad member have peripherally spaced pairs of axially aligned bores formed therein, said connecting pins slidably engaging respective of said bores and comprising spring means individually urging said pins to their advanced positions.

10. The combination of claim 9, wherein said pin retracting elements include cam members connected to respective of said pins and said pin retracting member comprises a follower adapted successively to engage said cam members with the advance of said frame member.

11. The combination of claim 8, wherein said pad member has a port formed in the underface thereof and said label pickup means comprises means connecting said port to a low pressure source.

12. The combination of claim 11, wherein said pad member has a transverse bore formed therein communicating with said port and one of said connecting pins is tubular and engages said bore in its advanced position, said low pressure connecting means communicating with said tubular pin.

13. The combination of claim 8, wherein said frame and pad member are vertically movable relative to said work support member.

14. In combination with a sewing machine including a needle vertically reciprocatable along a predetermined path, means for driving said needle, a work support member positioned below said needle and means for advancing said work support member along a predetermined horizontal path with the reciprocation of said needle, a horizontally swingable bracket arm hinged to said work support member at a point movable therewith, a label magazine having an upper label dispensing opening, a frame mounted on said bracket arm and horizontally movable therewith between a retracted position in registry with said work support member and an advanced position in registry with said label dispensing opening and movable with said work support member along said horizontal path, a pad member having a suction port in its underface and registering with said frame member and having a peripheral edge spaced from said frame member and delineating therewith a passageway corresponding to said work support member horizontal path, a plurality of connecting elements peripherally spaced along said passageway and extending in their advanced position from said frame across said passageway into releasable engagement with said pad member and individually retractable from said passageway, spring means urging said connecting element toward their advanced positions, means connecting said pad member suction port to a source of reduced pressure, a connecting element retracting member supported above said work support member, and retracting elements coupled to said connecting pins and successively movable into retracting engagement with said retracting member with the movement of said frame along said predetermined horizontal path.

15. The combination of claim 14, including means for sequentially advancing and retracting said bracket arm frame and pad whereby to pick up a label from said magazine and then depressing said frame and pad member to their lower positions.

16. The combination of claim 15, including means for motivating said needle drive means following the depressing of said frame and pad member in their retracted positions.

17. The combination of claim 15, wherein said connecting element retracting member is vertically movable and including means for raising and lowering said retracting member substantially with the raising and lowering of said frame member in its retracted position.

18. The combination of claim 14, including means for sequentially advancing said frame in its raised position, depressing and raising said frame at its advanced position to pick up a label from said magazine, retracting said frame, depressing said frame, motivating said needle drive means, demotivating said needle drive means and raising said frame.

19. The combination of claim 18, wherein, said sequencing means comprises a cam shaft, means for intermittently rotating said cam shaft a single revolution, a plurality of axially spaced cams affixed to said cam shaft, a respective follower engaging each of said cams, means for operatively connecting a first of said cam followers to said bracket, means for operatively connecting a second of said cam followers to said frame in its retracted position, means for operatively connecting a third of said cam followers to said frame at its advanced position, and means for operatively connecting a fourth of said cam followers to said needle driving means.

20. The combination of claim 14, including a platform adapted to support a stack of labels in registry with said magazine dispensing opening, and means for raising said platform in response to the level of the top of said stack.

References Cited

UNITED STATES PATENTS

| | | | |
|---|---|---|---|
| 1,695,555 | 12/1928 | Mayo | 112—2 |
| 2,548,692 | 4/1951 | Vollman et al. | 112—104 |
| 3,104,637 | 9/1963 | Hedegaard | 112—104 |

JORDAN FRANKLIN, *Primary Examiner.*

G. V. LARKIN, *Assistant Examiner.*